(12) United States Patent
Berjot et al.

(10) Patent No.: US 12,337,979 B2
(45) Date of Patent: Jun. 24, 2025

(54) ENGINE PYLON FOR FASTENING AN AIRCRAFT ENGINE

(71) Applicant: Airbus Operations SAS, Toulouse (FR)

(72) Inventors: Michael Berjot, Toulouse (FR); Pierre-Antoine Combes, Toulouse (FR); Marc De Nicola, Toulouse (FR); Jean-Baptiste Vignes, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/626,575

(22) Filed: Apr. 4, 2024

(65) Prior Publication Data
US 2024/0336365 A1 Oct. 10, 2024

(30) Foreign Application Priority Data
Apr. 6, 2023 (FR) ........................................ 2303417

(51) Int. Cl.
*B64D 27/40* (2024.01)

(52) U.S. Cl.
CPC .................................. *B64D 27/402* (2024.01)

(58) Field of Classification Search
CPC ..... B64D 27/402; B64D 27/404; B64D 27/40
See application file for complete search history.

(56) References Cited

U.S. PATENT DOCUMENTS

| | | |
|---|---|---|
| 6,474,597 B1 | 11/2002 | Cazenave |
| 2008/0251634 A1 | 10/2008 | Bernardi et al. |
| 2017/0057652 A1 | 3/2017 | Journade et al. |
| 2020/0298986 A1 | 9/2020 | Cayssials et al. |
| 2021/0222648 A1 | 7/2021 | Cazeaux |

FOREIGN PATENT DOCUMENTS

| | | |
|---|---|---|
| EP | 1103463 A1 | 5/2001 |
| FR | 3101675 A1 | 4/2021 |

OTHER PUBLICATIONS

French Search Report for corresponding French Patent Application No. 2303417 dated Sep. 22, 2023.

*Primary Examiner* — Philip J Bonzell
*Assistant Examiner* — Eric Acosta
(74) *Attorney, Agent, or Firm* — Greer, Burns & Crain, Ltd.

(57) ABSTRACT

An engine pylon has a structure for fastening an aircraft engine beneath a wing and has two lateral faces. The structure has a tunnel laterally passing through it, between and through the lateral faces, and the engine pylon has a spreader housed in the tunnel and fastened in an articulated manner to each lateral face. A first end of the spreader has a first bore. A second end of the spreader has two second bores each forming a connection point with the engine. A rod is fastened in an articulated manner to the first bore and has two third bores each forming a connection point with the engine. Such an engine pylon has the ability to attach the engine, with reduced vertical bulk and with less drag.

6 Claims, 3 Drawing Sheets

ENGINE PYLON FOR FASTENING AN AIRCRAFT ENGINE

CROSS-REFERENCES TO RELATED APPLICATIONS

This application claims the benefit of the French patent application No. 2303417 filed on Apr. 6, 2023, the entire disclosures of which are incorporated herein by way of reference.

FIELD OF THE INVENTION

The present invention relates to an engine pylon making it possible to ensure the fastening of an aircraft engine, and to an aircraft having at least one such engine pylon.

BACKGROUND OF THE INVENTION

An aircraft conventionally has at least one engine, in particular a jet engine. Beneath each wing, and for each engine, the aircraft has an engine pylon that is fastened to the structure of the wing and that extends below the wing, and the engine is suspended beneath the engine pylon.

The engine is fastened to the engine pylon by way of a plurality of engine attachment systems distributed between the front and the rear of the engine.

The aircraft has, for example, a front engine attachment system and a rear engine attachment system that are fastened respectively to the front and the rear of the engine between the engine and the engine pylon. The aircraft generally also has a device for reacting thrust forces of the engine between the front engine attachment system and the rear engine attachment system, constituted of two rods fastened on either side of the engine between the engine and the engine pylon.

Certain engine attachment systems of the prior art have beams that are fastened beneath the engine pylon and the combined vertical dimensions of the engine pylon and the beam are then relatively large, and this prevents the engine from being brought closer to the engine pylon.

SUMMARY OF THE INVENTION

An object of the present invention is to propose an engine pylon that has a reduced vertical bulk, and this makes it possible to bring the engine closer to the engine pylon.

To this end, an engine pylon for fastening an engine of an aircraft is proposed, the engine pylon having:
  a structure configured to be fastened beneath a wing of the aircraft and having two lateral faces, wherein the structure has a tunnel passing through it, wherein each of the two ends of the tunnel emerges at one of the lateral faces,
  a spreader housed in the tunnel and fastened in an articulated manner to each lateral face by a first connection point, wherein a first end of the spreader has a first bore, and wherein a second end of the spreader has two second bores each configured to form a second connection point with the engine, and
  a rod fastened in an articulated manner to the first bore and having two third bores each configured to form a third connection point with the engine.

Such an engine pylon thus has the ability to attach the engine, with reduced vertical bulk and with less drag.

Advantageously, each first connection point is constituted of a first female clevis fastened to the outside of the corresponding lateral face, a single male clevis constituted by the spreader, wherein the spreader is disposed inside each first female clevis, a first connection pin and a first ball joint ring inserted and fastened in a bore of the spreader provided for that purpose and wherein the first connection pin is housed and fastened in the first ball joint ring and housed free to rotate in bores of the first female clevis provided for that purpose.

Advantageously, the rod is constituted of two shackles disposed on either side of the first end of the spreader, each of the third bores is constituted of a third sub-bore made in one of the shackles and a third sub-bore made in the other of the shackles, a third ball joint ring is inserted and fastened in the first bore of the spreader and a third connection pin is housed and fastened in the third ball joint ring and housed free to rotate in a fourth sub-bore provided for that purpose in each shackle.

The invention also proposes an aircraft having a wing, an engine having a structure and an engine pylon according to one of the preceding variants, wherein the structure of the engine pylon is fastened beneath the wing and wherein the two second bores each form a second connection point with the structure of the engine, and wherein the two third bores each form a third connection point with the structure of the engine.

Advantageously, each second connection point is constituted of a second female clevis as one with the structure of the engine, a single male clevis constituted by the second end of the spreader, wherein the spreader is disposed inside each second female clevis, a second connection pin and a second ball joint ring inserted and fastened in the second bore of the spreader and wherein the second connection pin is housed and fastened in the second ball joint ring and housed free to rotate in bores provided for that purpose in the second female clevis.

Advantageously, each third connection point is constituted of a pair of third female clevises as one with the structure of the engine, for each third female clevis of the pair, a male clevis constituted by one of the rods disposed inside the third female clevis, a fourth connection pin and a fourth ball joint ring inserted and fastened in the third sub-bores of each shackle and wherein the fourth connection pin is housed fastened in the fourth ball joint ring and housed free to rotate in the third sub-bores.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
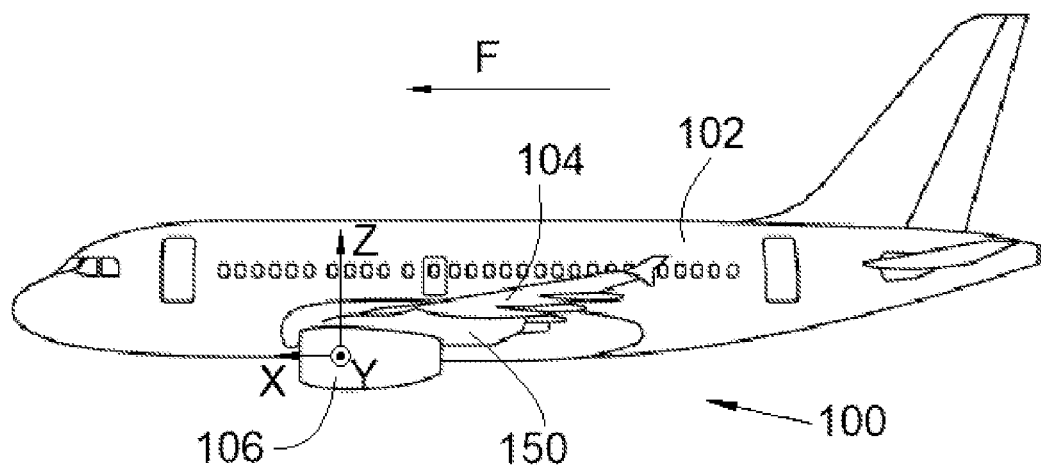
FIG. 1 is a side view of an aircraft according to the invention.

In the following description, terms relating to a position are considered in relation to an aircraft in a position of forward movement, i.e., as shown in FIG. 1, in which the arrow F represents the direction of forward movement.

FIG. 1 shows an aircraft 100 that has a fuselage 102 to which is fastened, on either side, a wing 104. The aircraft 100 also has at least one engine 106, in particular a jet engine, which is fastened beneath an engine pylon 150 according to the invention that has a structure 152 (FIG. 2) that is itself fastened beneath a wing 104 by any suitable fastening means known to a person skilled in the art.

In the following description, and by convention, the X direction is the longitudinal direction of the engine pylon 150, which is generally horizontal with positive orientation in the direction of forward movement F of the aircraft 100, the Y direction is the transverse direction of the engine pylon 150, which is horizontal when the aircraft 100 is on the ground, and the Z direction is the vertical direction or vertical height when the aircraft 100 is on the ground, these three directions X, Y and Z being mutually orthogonal.

The terms "front" and "rear" are to be considered relative to the direction of forward movement F of the aircraft 100 under the effect of the thrust provided by the engine 106 in operation.

Figure 2:
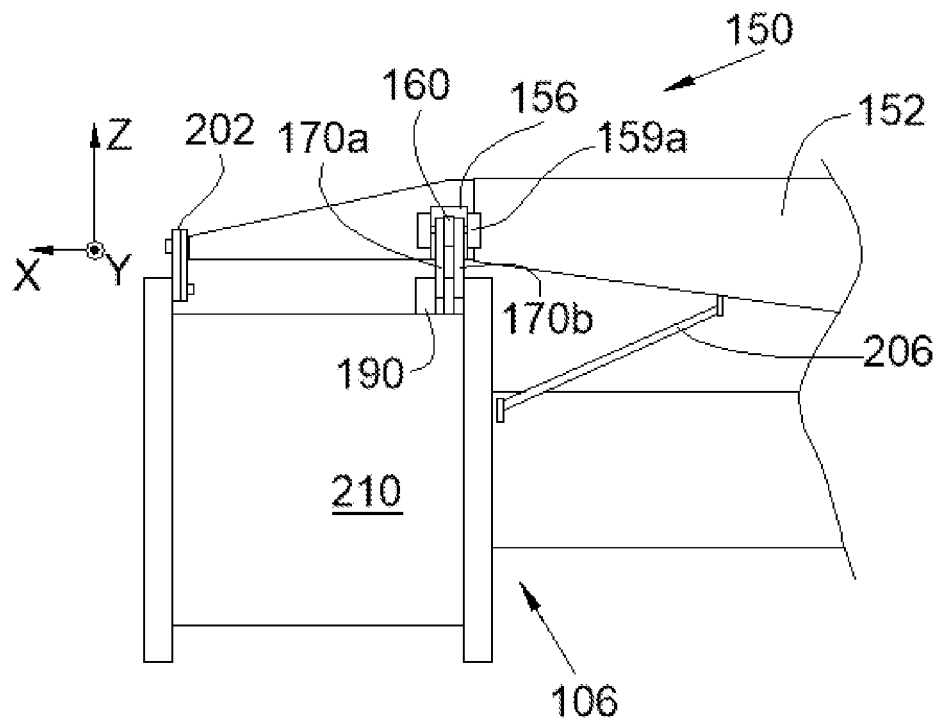
FIG. 2 is a schematic side view of an engine and an engine pylon according to the invention.

FIG. 2 shows a schematic depiction of the engine 106 and the engine pylon 150, which are fastened to one another by engine attachment systems. The engine pylon 150 has a vertical median plane XZ passing through the longitudinal direction X and the vertical direction Z.

FIG. 2 thus shows a front engine attachment system 202 ensuring the fastening between a front part of a structure 210 of the engine 106 and the structure 152 of the engine pylon 150.

In the embodiment of the invention that is presented in FIG. 2, the aircraft 100 also has a device for reacting thrust forces 206 having two rods disposed on either side of the vertical median plane XZ and wherein each rod is fastened between the structure 210 of the engine 106 and the structure 152 of the engine pylon 150. The aircraft 100 may also have a rear engine attachment that is not depicted in FIG. 2 but would be disposed at the rear of the device for reacting thrust forces 206 and fastened between the structure 210 of the engine 106 and the structure 152 of the engine pylon 150. The front and rear engine attachment systems 202 and the device for reacting thrust forces 206 are not described further since they do not form part of the invention and can take any of the forms known to a person skilled in the art.

Figure 3:
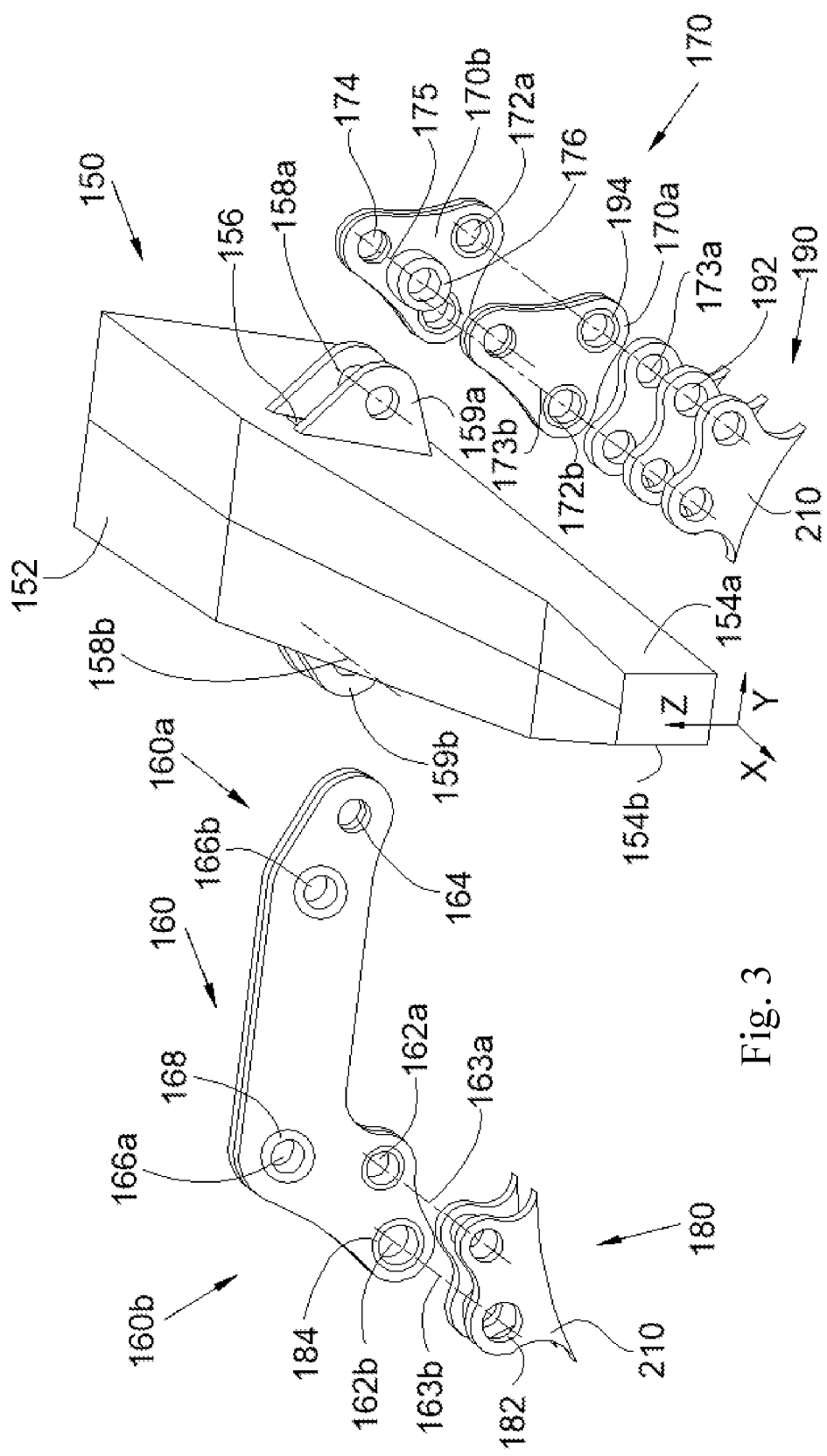
FIG. 3 is an exploded perspective view of the engine pylon according to the invention.
Figure 4:
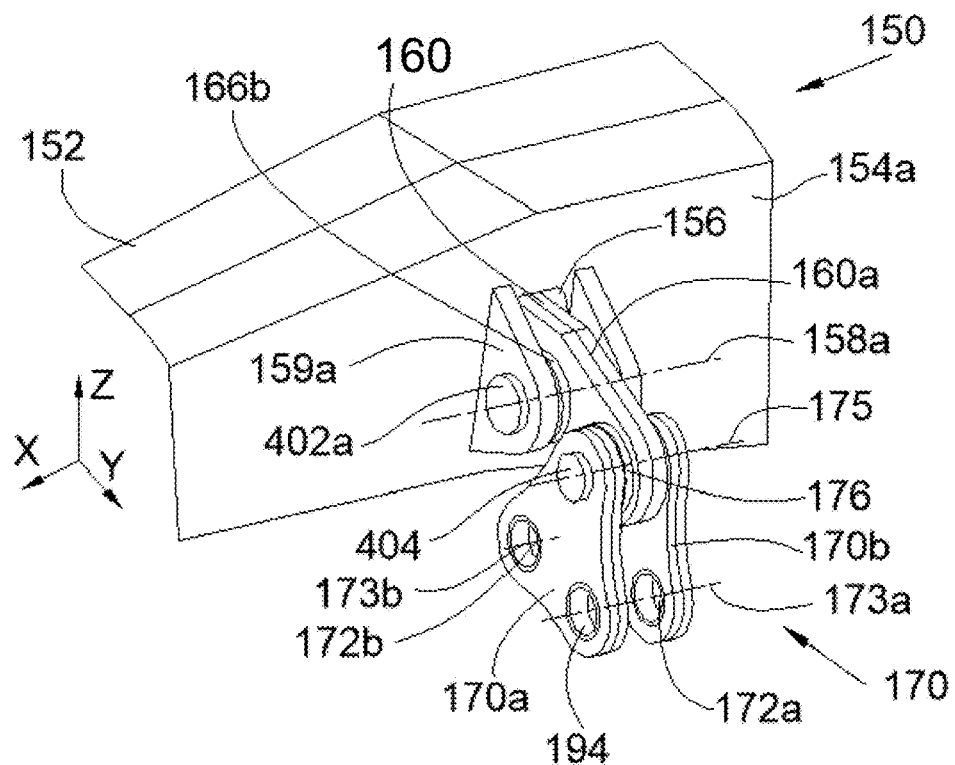
FIG. 4 is a perspective view of the port side of the engine pylon in FIG. 3.
Figure 5:
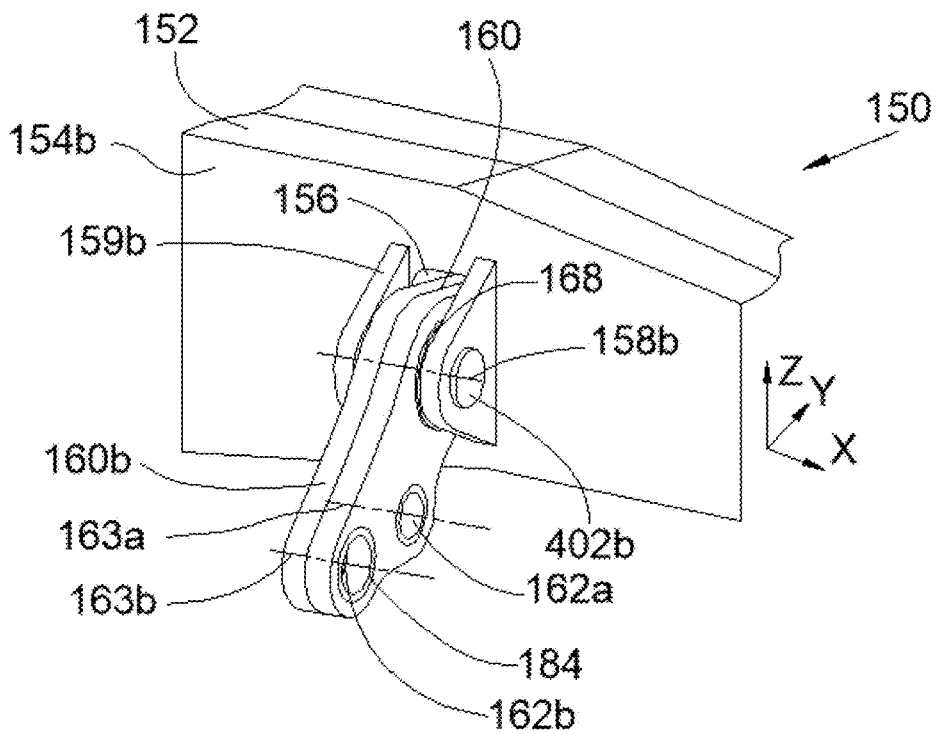
FIG. 5 is a perspective view of the starboard side of the engine pylon in FIG. 3.

FIG. 3 shows the engine pylon 150 in an exploded view and FIGS. 4 and 5 show the engine pylon 150 respectively from the port side and the starboard side.

The structure 152 of the engine pylon 150 takes the form of a box that has, inter alia, two lateral faces 154a-b, respectively on the port side and on the starboard side. The two lateral faces 154a-b are disposed on either side of the median plane XZ and are generally parallel to the median plane XZ and form the outer lateral walls of the structure 152 of the engine pylon 150.

The structure 152 of the engine pylon 150 has a tunnel 156 passing through it. The tunnel 156 extends generally perpendicular to the median plane XZ, i.e. in the transverse direction Y. The tunnel 156 has an opening at each of its two ends and each opening emerges at one of the lateral faces 154a-b. There is therefore one opening on the port side and one opening on the starboard side.

The engine pylon 150 also has a spreader 160 that is housed in the tunnel 156, wherein each end of the spreader 160 protrudes through an opening of the tunnel 156. The spreader 160 thus has a first end 160a, in this case on the port side, which extends beyond the lateral face 154a on the port side, and a second end 160b, in this case on the starboard side, which extends beyond the lateral face 154b on the starboard side. Depending on the circumstances, the first and second ends 160a-b of the spreader 160 can be reversed.

The spreader 160 is fastened in an articulated manner to each lateral face 154a-b by a first connection point 158a-b.

The first end 160a of the spreader 160 has a first bore 164 of which the axis is generally parallel to the longitudinal direction X and which is arranged so as to be on the outside of the structure 152 of the engine pylon 150 when the spreader 160 is in place in the tunnel 156.

The second end 160b of the spreader 160 has two second bores 162a-b, wherein the axis of each one is generally parallel to the longitudinal direction X and wherein each one is arranged so as to be on the outside of the structure 152 of the engine pylon 150 when the spreader 160 is in place in the tunnel 156.

Each second bore 162a-b is arranged so as to form, with the structure 210 of the engine 106, a second connection point 163a-b that ensures articulated fastening between the structure 210 of the engine 106 and the spreader 160.

The engine pylon 150 also has a rod 170 fastened in an articulated manner to the first bore 164. The rod 170 also has two third bores 172a-b, wherein the axis of each one is generally parallel to the longitudinal direction X.

Each third bore 172a-b is arranged so as to form, with the structure 210 of the engine 106, a third connection point 173a-b that ensures articulated fastening between the structure 210 of the engine 106 and the rod 170.

The passage of the spreader 160 through the tunnel 156 makes it possible to bring the engine 106 closer to the engine pylon 150 and thus save space vertically. Furthermore, such an arrangement makes it possible to integrate the reaction of the forces inside the structure 152 of the engine pylon 150.

In the embodiment of the invention that is presented in FIG. 3, each connection point 158a-b, 163a-b, 173a-b, 175 preferentially takes the form of a ball joint connection.

In the embodiment of the invention that is presented in FIG. 3, each first connection point 158a-b is constituted of a first female clevis 159a-b fastened to the outside of the lateral face 154a-b corresponding to the first connection point 158a-b and a single male clevis constituted by the spreader 160, wherein the spreader 160 is disposed inside each first female clevis 159a-b.

Conventionally, each first female clevis 159a-b is constituted of two parallel walls disposed on either side of the opening of the tunnel 156 corresponding to the lateral face 154a-b and each wall of the first female clevis 159a-b has a bore passing through it, of which the axis is generally parallel to the longitudinal direction X. For each first female clevis 159a-b, the spreader 160 has a bore 166a-b, of which the axis is coaxial with the axis of the bores of the first female clevis 159a-b.

Each first connection point 158a-b also has a first connection pin 402a-b (FIGS. 4 and 5), and a first ball joint ring 168 inserted and fastened in the bore 166a-b of the spreader 160 corresponding to the first connection point 158a-b, and wherein the first connection pin 402a-b is housed and fastened in the first ball joint ring 168 and housed free to rotate in the bores of the first female clevis 159a-b corresponding to the first connection point 158a-b.

In the embodiment of the invention that is presented in FIG. 3, each second connection point 163a-b is constituted of a second female clevis 180 as one with the structure 210 of the engine 106 and a single male clevis constituted by the second end 160b of the spreader 160 that is disposed inside each second female clevis 180.

Each second female clevis 180 is constituted of two parallel walls and each wall has a bore 182 passing through it, of which the axis is generally parallel to the longitudinal direction X. For each second female clevis 180, the spreader 160 has a bore 162*a-b* of which the axis is coaxial with the axis of the bores 182 of the second female clevis 180. In the embodiment of the invention that is presented in FIG. 3, each wall of a second female clevis 180 is in one piece with one of the walls of the other second female clevis 180.

Each second connection point 163*a-b* also has a second connection pin and a second ball joint ring 184 inserted and fastened in the second bore 162*a-b* of the spreader 160 corresponding to the second connection point 163*a-b*, and wherein the second connection pin is housed and fastened in the second ball joint ring 184 and housed free to rotate in the bores 182 of the second female clevis 180 corresponding to the second connection point 163*a-b*.

For safety reasons, the rod 170 is constituted of two shackles 170*a-b* that are disposed one behind the other along the longitudinal direction X and each of the third bores 172*a-b* is constituted of a third sub-bore made in one of the shackles 170*a-b* and a third sub-bore made in the other of the shackles 170*b-a*. The third sub-bores corresponding to one and the same third bore 172*a-b* are coaxial.

In the embodiment of the invention that is presented in FIG. 3, each shackle 170*a-b* has a fourth sub-bore 174 of which the axis is generally parallel to the longitudinal direction X. The fourth sub-bores 174 are coaxial with each other and with the first bore 164 and are arranged so as to form, with the first bore 164, a fourth connection point 175 that ensures articulated fastening between the rod 170 and the spreader 160.

The two shackles 170*a-b* are disposed on either side of the first end 160*a* of the spreader 160 so as to together form a fourth female clevis.

The fourth connection point 175 also has a third connection pin 404 and a third ball joint ring 176 inserted and fastened in the first bore 164 of the spreader 160 and wherein the third connection pin 404 is housed and fastened in the third ball joint ring 176 and housed free to rotate in the fourth sub-bores 174.

In the embodiment of the invention that is presented in FIG. 3, each third connection point 173*a-b* is constituted of a pair of third female clevises 190 as one with the structure 210 of the engine 106. The two third female clevises 190 of the pair are disposed one behind the other along the longitudinal direction X and there is one third female clevis 190 associated with one of the shackles 170*a-b* and the other third female clevis 190 associated with the other of the shackles 170*b-a*.

For each third female clevis 190 of the pair, the corresponding third connection point 173*a-b* thus has a male clevis constituted by one of the shackles 170*a-b* disposed inside the third female clevis 190.

The two third female clevises 190 of a pair are, in this case, constituted of three parallel walls disposed one after the others, and each third female clevis 190 is formed by two neighboring walls. Each wall has a bore 192 passing through it, of which the axis is generally parallel to the longitudinal direction X. For each third female clevis 190, the shackle 170*a-b* has a third sub-bore, of which the axis is coaxial with the axis of the bores 192 of the third female clevis 190. In the embodiment of the invention that is presented in FIG. 3, each wall of a third female clevis 190 corresponding to a third connection point 173*a-b* is in one piece with one of the walls of the other third female clevis 190 corresponding to the other third connection point 173*b-a*.

Each third connection point 173*a-b* also has a fourth connection pin and a fourth ball joint ring 194 inserted and fastened in the third sub-bores of each shackle 170*a-b* corresponding to the third connection point 173*a-b*, and wherein the fourth connection pin is housed and fastened in the fourth ball joint ring 194 and housed free to rotate in the third sub-bores corresponding to the third connection point 173*a-b*.

For safety reasons, the third connection pin 404 of the fourth connection point 175 is doubled, i.e., it is constituted of a first hollow cylinder and a second cylinder nested in the first cylinder.

For safety reasons, the spreader 160 and each shackle 170*a-b* are constituted of two plates fastened one against the other, wherein, for each bore or sub-bore that has a connection pin passing through it, each plate has a piercing forming a part of the bore or sub-bore. Thus, in the event of one of the plates of a shackle 170*a-b* breaking, the other plate remains operational.

The various connection pins ensure the transfer of the forces from the engine 106 to the structure 152 of the engine pylon 150 by creating paths for reacting forces through the various elements.

In the embodiment of the invention that is presented in FIGS. 3 to 5, one of the second bores 162*a-b* and one of the third bores 172*a-b* participate in the main path for reacting forces (i.e., operation under nominal conditions), while the other of the second bores 162*b-a* and the other of the third bores 172*b-a* constitute a backup system that participates in the path for reacting forces only in the event of the one of the second bores 162*a-b*, respectively the one of the third bores 172*a-b*, breaking. Of course, a reverse arrangement is also possible.

Thus, in the event of the path for reacting forces breaking at the second bore 162*a-b* participating in the main path for reacting forces, respectively the third bore 172*a-b* participating in the main path for reacting forces, the second bore 162*b-a*, respectively the third bore 172*b-a*, which do not participate in the main path for reacting forces, react the forces under deteriorated conditions.

Thus, in the event of the path for reacting forces breaking at one of the first female clevises 159*a-b* or the first associated connection pin 402*a-b*, the spreader 160 will pivot around the other first female clevis 159*b-a* and come to abut against the walls of the tunnel 156 and therefore the structure 152 of the engine pylon 150 so as to react the forces.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine pylon for fastening an engine of an aircraft, the engine pylon having:

a structure configured to be fastened beneath a wing of the aircraft and having two lateral faces, wherein the structure has a tunnel with two ends passing therethrough, wherein each of the two ends of the tunnel emerges at one of the two lateral faces, a spreader housed in the tunnel and fastened in an articulated manner to each lateral face by a first connection point, wherein a first end of the spreader has a first bore, and wherein a second end of the spreader has two second bores each configured to form a second connection point with the engine, and a rod fastened in an articulated manner to said first bore and having two third bores each configured to form a third connection point with the engine.

2. The engine pylon according to claim 1, wherein each first connection point is constituted of a first female clevis fastened to an outside of a corresponding lateral face, a single male clevis being constituted by the spreader, wherein the spreader is disposed inside each first female clevis, a first connection pin and a first ball joint ring being inserted and fastened in a bore of the spreader provided for such insertion, and wherein the first connection pin is housed and fastened in the first ball joint ring and housed free to rotate in bores of the first female clevis provided for such rotatable housing.

3. The engine pylon according to claim 1, wherein the rod is constituted of two shackles disposed on either side of the first end of the spreader, wherein each of the third bores is constituted of a third sub-bore made in one of the shackles and a third sub-bore made in the other of the shackles, wherein a third ball joint ring is inserted and fastened in the first bore of the spreader, and wherein a third connection pin is housed and fastened in the third ball joint ring and housed free to rotate in a fourth sub-bore provided for such rotatable housing in each shackle.

4. An aircraft comprising:

a wing, an engine having a structure and an engine pylon according to claim 1, wherein the structure of the engine pylon is fastened beneath the wing, wherein the two second bores each form a second connection point with the structure of the engine, and wherein the two third bores each form a third connection point with the structure of the engine.

5. The aircraft according to claim 4, wherein each second connection point is constituted of a second female clevis as one with the structure of the engine, a single male clevis being constituted by the second end of the spreader, wherein the spreader is disposed inside each second female clevis, a second connection pin and a second ball joint ring being inserted and fastened in the second bore of the spreader, and wherein the second connection pin is housed and fastened in the second ball joint ring and housed free to rotate in bores provided for such rotatable housing in the second female clevis.

6. The aircraft according to claim 4, wherein the rod is constituted of two shackles disposed on either side of the first end of the spreader, wherein each of the third bores is constituted of a third sub-bore made in one of the shackles and a third sub-bore made in the other of the shackles, wherein a third ball joint ring is inserted and fastened in the first bore of the spreader, wherein a third connection pin is housed and fastened in the third ball joint ring and housed free to rotate in a fourth sub-bore provided for such rotatable housing in each shackle, wherein each third connection point is constituted of a pair of third female clevises as one with the structure of the engine, for each third female clevis of the pair of third female clevises, a male clevis being constituted by one of the rods disposed inside said third female clevis, a fourth connection pin and a fourth ball joint ring being inserted and fastened in the third sub-bores of each shackle, and wherein the fourth connection pin is housed fastened in the fourth ball joint ring and housed free to rotate in the third sub-bores.

* * * * *